United States Patent
Park et al.

(10) Patent No.: US 9,253,676 B2
(45) Date of Patent: Feb. 2, 2016

(54) APPARATUS AND METHOD OF REPORTING MEASUREMENT RESULT IN WIRELESS COMMUNICATION SYSTEM

(75) Inventors: Sung Jun Park, Anyang-si (KR); Sung Duck Chun, Anyang-si (KR); Sung Hoon Jung, Anyang-si (KR); Seung June Yi, Anyang-si (KR); Young Dae Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 13/806,615

(22) PCT Filed: Aug. 11, 2011

(86) PCT No.: PCT/KR2011/005895
§ 371 (c)(1),
(2), (4) Date: Dec. 21, 2012

(87) PCT Pub. No.: WO2012/021005
PCT Pub. Date: Feb. 16, 2012

(65) Prior Publication Data
US 2013/0100846 A1      Apr. 25, 2013

Related U.S. Application Data

(60) Provisional application No. 61/373,256, filed on Aug. 12, 2010.

(51) Int. Cl.
*H04W 24/10* (2009.01)
*H04W 52/02* (2009.01)
(Continued)

(52) U.S. Cl.
CPC .......... *H04W 24/10* (2013.01); *H04W 52/0203* (2013.01); *H04W 52/365* (2013.01); *H04L 1/1671* (2013.01); *H04W 72/1268* (2013.01); *Y02B 60/50* (2013.01)

(58) Field of Classification Search
CPC ............ H04W 24/10; H04W 52/0203; H04W 52/365; H04W 52/262; H04L 27/2601; H04L 5/009; H04L 1/1671
USPC .................................. 370/252; 455/423, 524
See application file for complete search history.

(56) References Cited

U.S. PATENT DOCUMENTS

2010/0130219 A1* 5/2010 Cave et al. ..................... 455/450
2010/0279679 A1* 11/2010 Young et al. .................. 455/423
(Continued)

FOREIGN PATENT DOCUMENTS

CN       101674586 A    3/2010

OTHER PUBLICATIONS

3GPP TSG RAN WG2 Meeting #70 R2-102799.*
(Continued)

*Primary Examiner* — Xavier Szewai Wong
(74) *Attorney, Agent, or Firm* — Birch, Stewart, Kolasch & Birch, LLP

(57) ABSTRACT

A method and apparatus of reporting a measurement result in a wireless communication system are provided. A user equipment receives a measurement configuration for a serving cell and performs a measurement in accordance with the measurement configuration to acquire an actual measurement result. The user equipment determines whether the serving cell is deactivated and transmits a measurement result including a pre-defined value if the serving cell is deactivated.

16 Claims, 5 Drawing Sheets

(51) Int. Cl.
*H04W 52/36* (2009.01)
*H04L 1/16* (2006.01)
*H04W 72/12* (2009.01)

(56) References Cited

U.S. PATENT DOCUMENTS

| | | | | |
|---|---|---|---|---|
| 2011/0134774 A1* | 6/2011 | Pelletier | ............. | H04W 52/365 370/252 |
| 2011/0243016 A1* | 10/2011 | Zhang | ................ | H04W 52/365 370/252 |
| 2011/0281615 A1* | 11/2011 | Yamada et al. | ............... | 455/524 |
| 2011/0300857 A1* | 12/2011 | Kazmi et al. | ................. | 455/423 |

OTHER PUBLICATIONS

Chang et al., "A Fractional Soft Handover Scheme for 3GPP LTE-Advanced System", IEEE International Conference on Communications Workshops. pp. 1-5, Jun. 2009.

Sawahashi at al., "Broadband Radio Access: LTE and LTE-Advanced", 2009 International Symposium on Intelligent Signal Processing and Communication Systems, Dec. 7-9, 2009, pp. 224-227.

Yuan et al., "Carrier Aggregation for LTE-Advanced Mobile Communication Systems", IEEE Communications Magazine, vol. 48. No. 2, pp. 88-93, Feb. 2010.

* cited by examiner

APPARATUS AND METHOD OF REPORTING MEASUREMENT RESULT IN WIRELESS COMMUNICATION SYSTEM

CROSS REFERENCE TO RELATED APPLICATIONS

This application is the National Phase of PCT/KR2011/005895 filed on Aug. 11, 2011, which claims priority under 35 U.S.C. 119(e) to U.S. Provisional Application No. 61/373,256 filed on Aug. 12, 2010, all of which are hereby expressly incorporated by reference into the present application.

TECHNICAL FIELD

The present invention relates to wireless communications, and more particularly, to a method and apparatus of reporting a measurement result in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The introduction of multiple carriers in 3GPP LTE results in the use of a plurality of serving cells. That is, the plurality of serving cells provides a user equipment with various services.

The number of usable serving cells among configured cells is not fixed but varies depending on user equipment's capability or a network condition. This is called activation/deactivation of the serving cell.

When the serving cell is frequently activated or deactivated, information related to the activated serving cell may be mismatched between the user equipment and a base station. For example, the base station deactivates the serving cell but the user equipment still regards the serving cell as the activated serving cell.

The mismatch may cause data loss or service quality deterioration.

DISCLOSURE OF INVENTION

Technical Problem

The present invention provides a method and apparatus for reporting a measurement result in a wireless communication system to reduce a mismatch associated with the activation of a serving cell.

Solution to Problem

In an aspect, a method of reporting a measurement result in a wireless communication system is provided. The method includes receiving, by a user equipment, a measurement configuration for a serving cell, performing, by the user equipment, a measurement in accordance with the measurement configuration to acquire an actual measurement result, determining, by the user equipment, whether the serving cell is deactivated, and transmitting, by the user equipment, a measurement result including a pre-defined value if the serving cell is deactivated and transmitting the measurement result including the actual measurement result if the serving cell is activated.

The actual measurement result may be a channel quality indicator.

The actual measurement result may be a power headroom of the user equipment.

The serving cell may be activated or deactivated by receiving an activation command from a base station.

In another aspect, an apparatus of reporting a measurement result in a wireless communication system is provided. The apparatus includes a radio frequency unit for transmitting and receiving radio signals, and a processor operatively coupled with the radio frequency unit and configured for receiving a measurement configuration for a serving cell, performing a measurement in accordance with the measurement configuration to acquire an actual measurement result, determining whether the serving cell is deactivated, and transmitting a measurement result including a pre-defined value if the serving cell is deactivated and transmitting the measurement result including the actual measurement result if the serving cell is activated.

Advantageous Effects of Invention

An activation/deactivation status of a serving cell can be prevented from being mismatched between a user equipment (UE) and a base station (BS).

MODE FOR THE INVENTION

Figure 1:
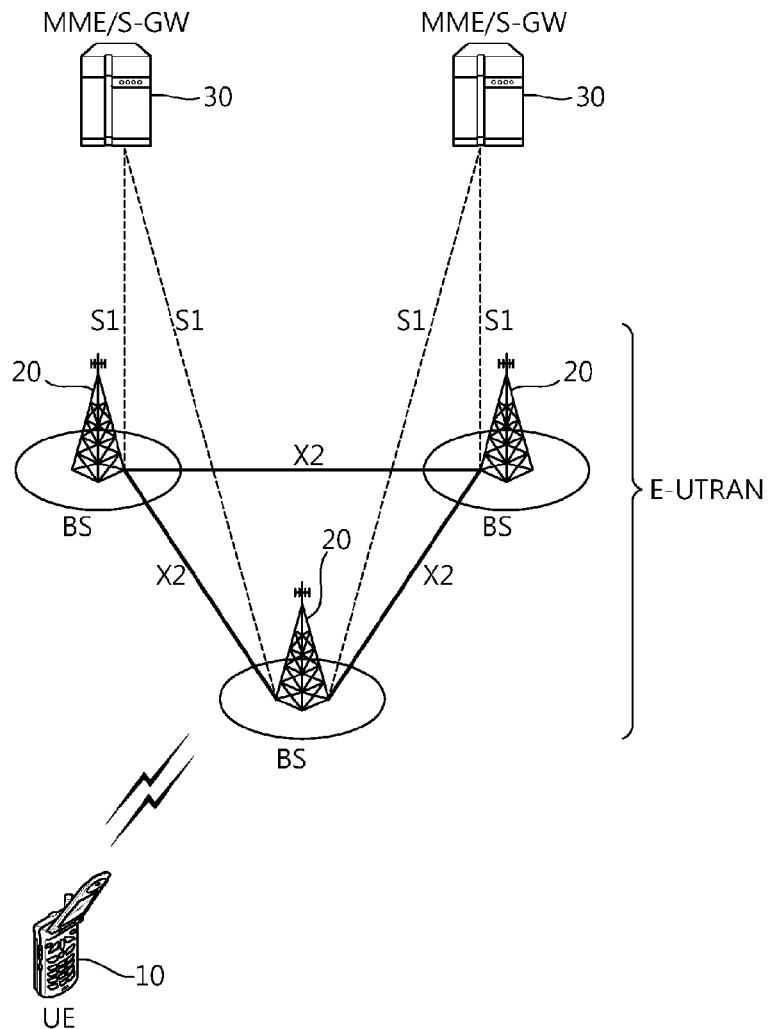
FIG. 1 shows a wireless communication system to which the present invention is applied.

FIG. 1 shows a wireless communication system to which the present invention is applied. A wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
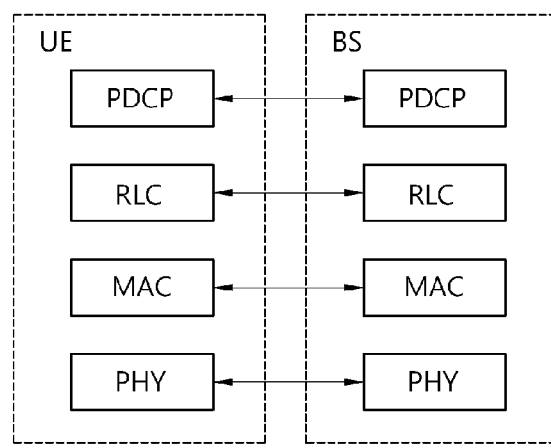
FIG. 2 is a diagram showing a radio protocol architecture for a user plane.
Figure 3:
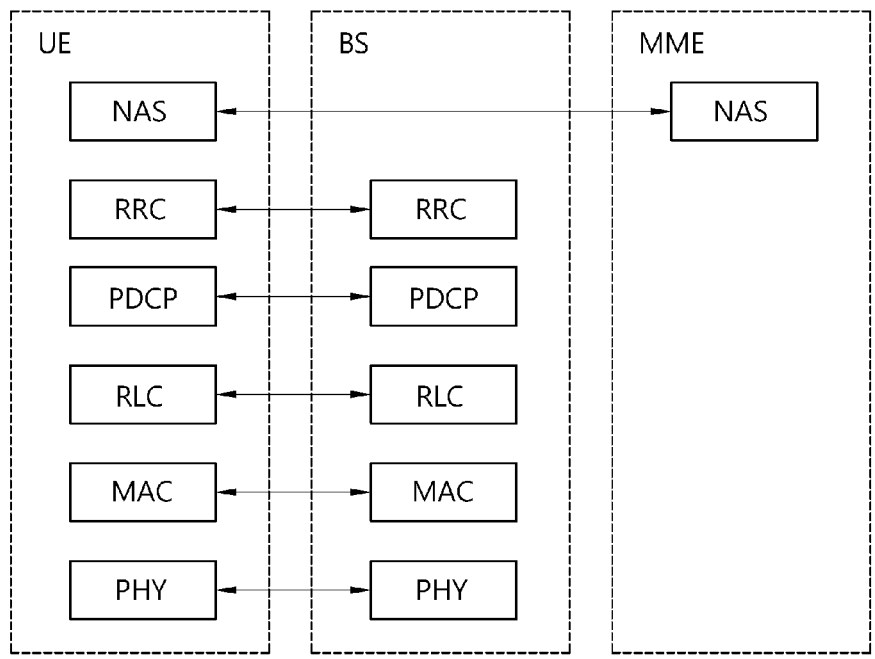
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., a physical downlink control channel (PDCCH), Physical Control Format Indicator Channel (PCFICH), Physical Hybrid-ARQ Indicator Channel (PHICH) and a physical uplink control channel (PUCCH).

Now, a multiple carrier system will be disclosed.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
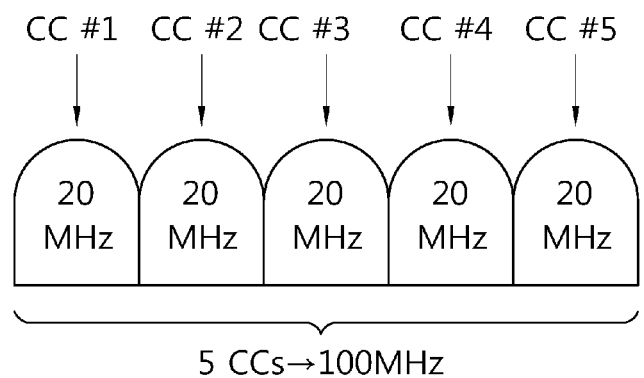
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
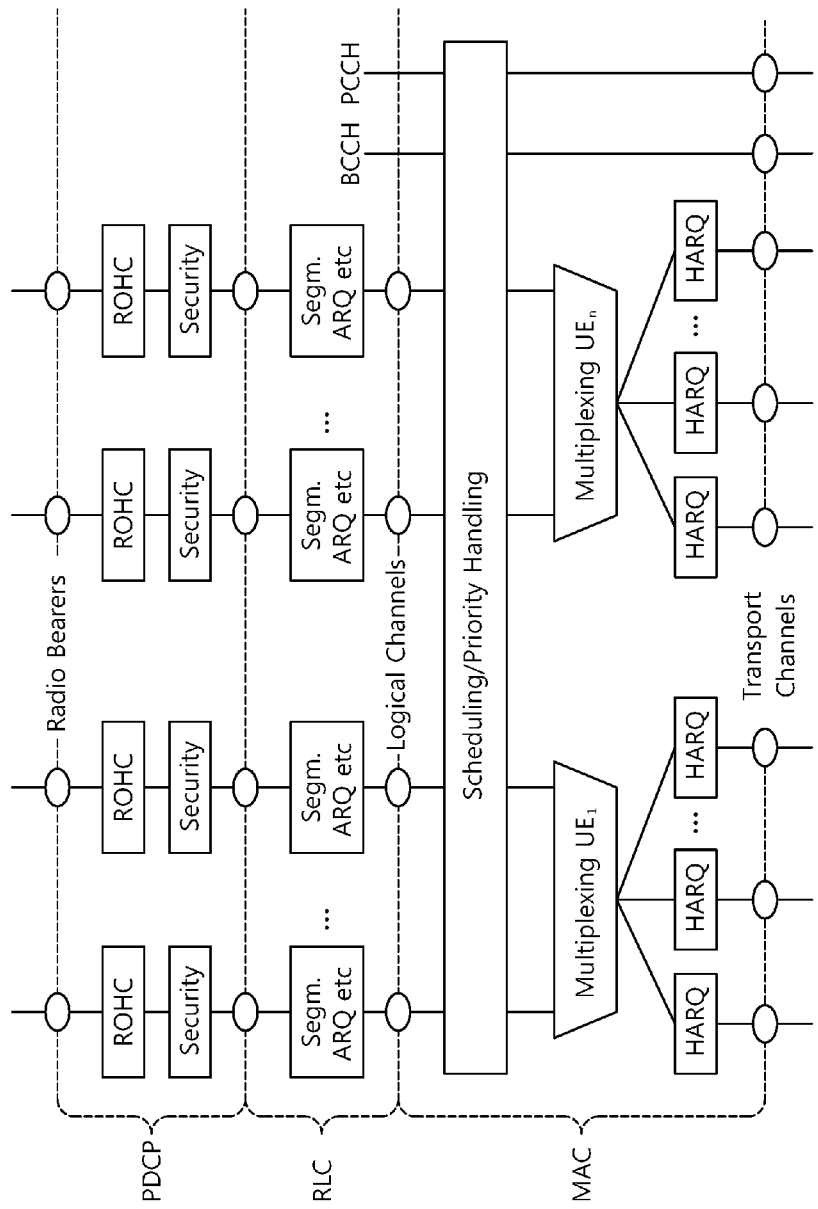
FIG. 5 shows a second-layer structure of a BS for multiple carriers.
Figure 6:
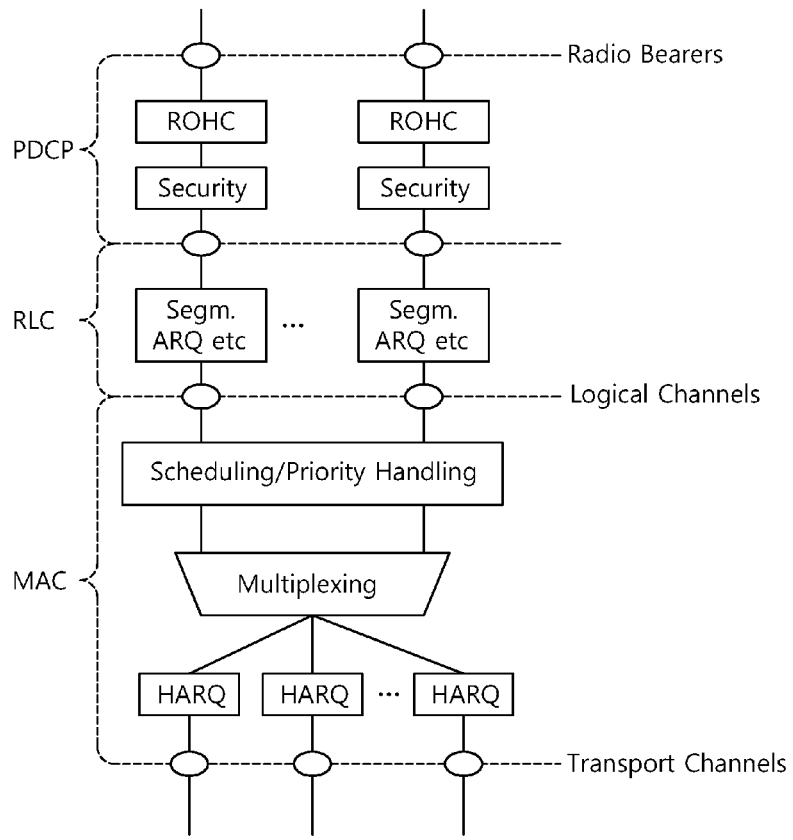
FIG. 6 shows a second-layer structure of a UE for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

A cell may be classified into a primary cell and a secondary cell. The primary cell is always activated and is operated in a primary frequency. In the primary cell, the UE either performs the initial connection establishment procedure or initiates the connection re-establishment procedure. The secondary cell may be activated or inactivated and is operated in a secondary frequency. The secondary cell may be configured once an RRC connection is established and may be used to provide additional radio resources. The primary cell may be configured with a pair of DL CC and UL CC. The secondary cell may be configured with a pair of DL CC and UL CC or a DL CC only. Serving cells include one or more primary cells and zero or more secondary cells.

Next, a power headroom reporting will be disclosed.

To mitigate interference due to UL transmission, a transmit power of a UE needs to be adjusted. If the transmit power of the UE is too low, the BS barely receive UL data. If the transmit power of the UE is too high, the UL transmission may give too much interference to other UE's transmission.

A power headroom reporting procedure is used to provide the serving BS with information about the difference between the nominal UE maximum transmit power and the estimated power for UL-SCH transmission. RRC controls the power headroom reporting by configuring the two timers, a periodic timer and prohibit timer, and by signalling a pathloss threshold which sets the change in measured downlink pathloss to trigger the power headroom reporting.

According to the section 5.1.1 of 3GPP TS 36.213 V8.8.0 (2009-09) "Evolved Universal Terrestrial Radio Access (E-UTRA); Physical layer procedures (Release 8)", According to the section 5.1.1 of 3GPP TS 36.213 V8.8.0 (2009-09) "Evolved Universal Terrestrial Radio Access (E-UTRA); Physical layer procedures (Release 8)", a power headroom valid for subframe i is defined by:

MathFigure 1

$$PH(i)=P_{CMAX}-\{10 \log_{10}(M_{PUSCH}(i))+P_{O\_PUSCH}(j)+ \alpha(j)PL+\Delta_{TF}(i)+f(i)\} \quad [\text{Math.1}]$$

where, $P_{CMAX}$ is the configured UE transmitted power, $M_{PUSCH}(i)$ is the bandwidth of the PUSCH resource assignment expressed in number of resource blocks valid for subframe i, PL is a downlink pathloss estimate calculated in the UE, and $P_{O\_PUSCH}(j)$, $\alpha(j)$, $\Delta_{TF}(j)$ and f(i) are parameters obtained from higher layer signaling.

A power headroom report (PHR) may be triggered if any of the following events occur:

a prohibit timer expires or has expired and the path loss has changed more than the pathloss threshold since the transmission of a PHR when UE has UL resources for new transmission;

a periodic timer expires;

upon configuration or reconfiguration of the power headroom reporting functionality by upper layers, which is not used to disable the function.

If the UE has UL resources allocated for new transmission for this TTI:

if it is the first UL resource allocated for a new transmission since the last MAC reset, start the periodic timer;

if the power headroom reporting procedure determines that at least one PHR has been triggered since the last transmission of a PHR or this is the first time that a PHR is triggered, and;

if the allocated UL resources can accommodate a PHR MAC control element plus its subheader as a result of logical channel prioritization:

obtain the value of the power headroom from the physical layer;

instruct the Multiplexing and Assembly procedure to generate and transmit a PHR MAC control element based on the value reported by the physical layer;

start or restart the periodic timer;

start or restart the prohibit timer;

cancel all triggered PHR(s).

The power headroom is transmitted as a MAC control element. A power headroom field in the MAC control element includes 6 bits.

Next, channel quality indicator (CQI) reporting will be disclosed.

Quality of a signal received by a UE in a wireless communication network varies depending on channel quality of a serving cell and an interference level and noise from another cell. In order to optimize system throughput and coverage, a BS needs to adjust a data rate according to a quality status of a signal received by a user. This is called link adaptation.

For the link adaptation, the user needs to measure quality of the serving cell and report the measured quality to the BS. This is called CQI reporting. The UE measures a CQI by using a reference signal.

Next, measurement reporting for radio resource management (RRM) will be disclosed.

A mobile communication system needs to support mobility of a UE. Therefore, the UE persistently measures quality for a serving cell that currently provides a service and quality for a neighboring cell. The UE reports a measurement result to a network at a proper time, and the network provides the UE with optimal mobility by using handover or the like.

Measurement configuration information may include the following information.

(1) Measurement object information: This information is in regards to an object for which measurement is performed by the UE. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighbor cell having the same frequency band as a frequency band of a serving cell, the inter-frequency measurement object may indicate a neighbor cell having a different frequency band from a frequency band of the serving cell, and the inter-RAT measurement object may indicate a neighbor cell of a different RAT from an RAT of the serving cell.

(2) Reporting configuration information: This information is in regards to a reporting type and a reporting condition regarding when the UE reports a measurement result. The reporting condition may include information on a period or an event for triggering reporting of the measurement result. The reporting type is information indicating a particular type according to which the measurement result is configured.

(3) Measurement identify information: This information is in regards to a measurement identifier for determining when and in what type the UE will report a specific measurement object by associating the measurement object with a reporting configuration. The measurement identify information may be included in the measurement report message to indicate a specific measurement object for which the measurement result is obtained and a specific reporting condition according to which the measurement report is generated.

(4) Quantity configuration information: This information is in regards to a measurement unit, a reporting unit, and/or a parameter for determining filtering of a measurement result value.

(5) Measurement gap information: This information is in regards to a measurement gap as a duration that can be used by the UE only for measurement without consideration of data transmission with a serving cell when downlink transmission or uplink transmission is not scheduled.

As described above, a plurality of serving cells can be present with the introduction of multiple carriers.

Figure 7:
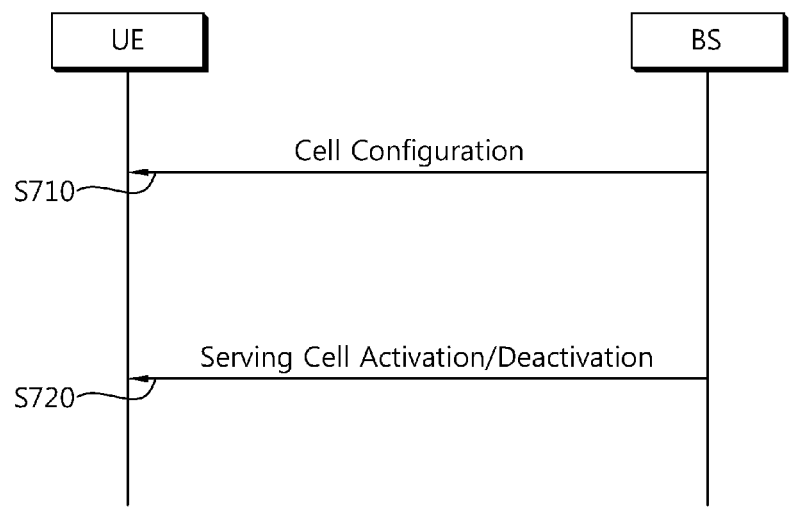
FIG. 7 is a flowchart showing a process of activating/deactivating a serving cell.

FIG. 7 is a flowchart showing a process of activating/deactivating a serving cell.

A BS sends a cell configuration to a UE (step S710). The cell configuration includes information regarding addition or deletion of a serving cell (more specifically, a secondary cell). The cell configuration may be included in an RRC message.

The BS commands activation/deactivation of the serving cell to the UE (step S720). The activation/deactivation command of the serving cell is transmitted as a MAC control element.

The activation/deactivation command of the serving cell may be lost. Therefore, an activation status of serving cells may be determined differently between the UE and the BS.

For example, it is assumed that the BS activates the secondary cell, but the UE determines that the second cell is deactivated. In order to reduce power consumption of the UE, measurement of the deactivated serving cell is performed restrictively, and thus the measurement result is inevitably incorrect. When the UE transmits to the BS the incorrect measurement result on the deactivated secondary cell, the BS determines that the measurement result is correct. Therefore, scheduling and/or handover performed by the BS by using the measurement result may be erroneous.

According to the proposed invention, the UE performs measurement reporting on the deactivated serving cell by using a pre-defined value instead of using an actual measurement result.

The measurement report may include a measurement result value for a serving cell, such as a report for a power headroom, CQI, and RRM, or may imply a result obtained by considering the measurement result value.

The configured secondary cell may be activated or deactivated by the deactivation command.

The configured secondary cell may be activated or deactivated by a deactivation timer. The deactivation timer starts when the secondary cell is activated. Upon receiving an uplink grant or a downlink grant for the secondary cell, the deactivation timer starts or restarts. At the expiry of the deactivation timer, the UE deactivates the secondary cell in association with the deactivation timer.

A measurement report on the deactivated serving cell may include a defined value which is known to the UE and the BS. For example, the UE reports to the BS a value (e.g., "000000" or "111111") which is defined irrespective of the measurement result as a headroom for the deactivated serving cell. Upon receiving the defined value, the BS may determine that the serving cell is deactivated.

Measurement reports on all serving cells may be transmitted to the BS as one message via a specific serving cell. For example, it is assumed that the UE has three serving cells. It is also assumed that a measurement report for the first serving cell is denoted by A, a measurement report for the second serving cell is denoted by B, and a measurement report for the third serving cell is denoted by C. In this case, the measurement reports A, B, and C are included in one message, and are transmitted to the BS via any serving cell or a designated serving cell among the three serving cells.

Figure 8:
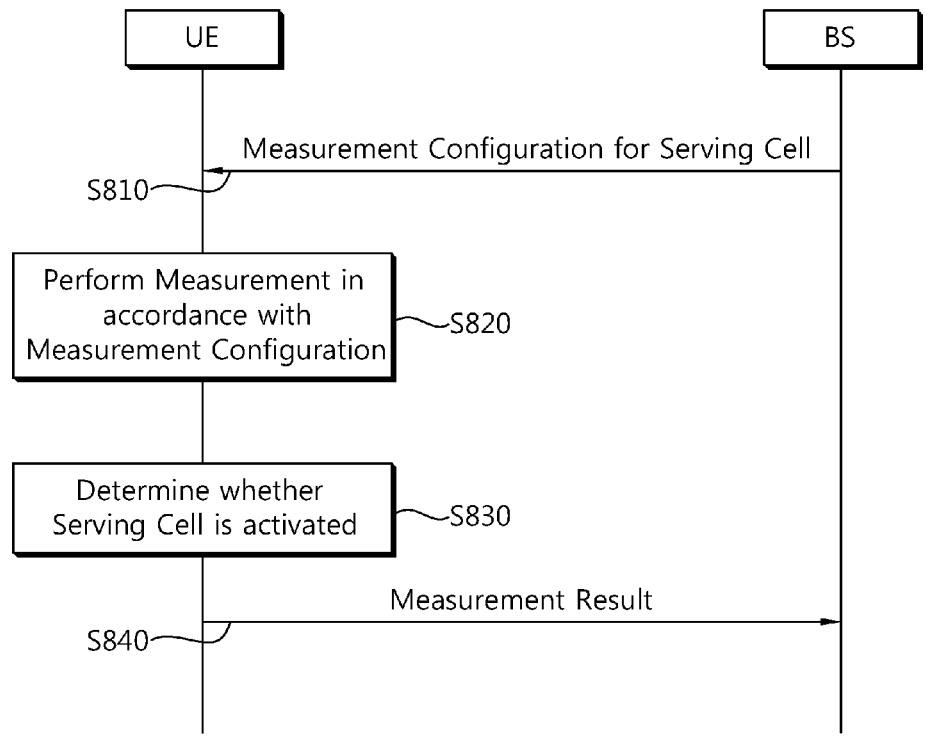
FIG. 8 is a flowchart showing a method of reporting a measurement result according to an embodiment of the present invention.

FIG. 8 is a flowchart showing a method of reporting a measurement result according to an embodiment of the present invention.

To clarity, it is assumed that a primary cell and a secondary cell are present as a serving cell. The primary cell is always activated. The secondary cell may be deactivated according to at least one of three methods as follows. First, if a UE has not received an activation command ever since addition of the secondary cell was instructed from a BS, the secondary cell may be in an deactivate state. Second, if the UE receives the deactivation command again after receiving the activation command of the secondary cell from the BS, the secondary cell is deactivated. Third, after receiving the activation command of the secondary cell from the BS, the UE starts a deactivation timer for the secondary cell. At the expiry of the deactivation timer, the secondary cell is deactivated.

The BS sends to the UE a measurement configuration related to measurement reporting on each serving cell (step S810). The measurement reporting which uses the measurement configuration may include at least one of power headroom reporting of the UE, CQI reporting, and measurement reporting for RRM.

The UE performs measurement in accordance with the measurement configuration (step S820). The UE may measure the serving cell irrespective of activation or deactivation of the serving cell. The measurement may be measurement for power headroom reporting, measurement for CQI reporting, measurement for RRM reporting, etc.

When reporting criteria are satisfied or measurement reporting is triggered, it is determined whether the serving cell is activated or deactivated (step S830).

The UE transmits a measurement result on each serving cell to the BS (step S840). Regarding an activated serving cell, the UE reports an actual measurement result to the BS. However, regarding a deactivated serving cell, the UE does not report the actual measurement result to the BS but reports a pre-defined value as the measurement result irrespective of the measurement result.

For example, it is assumed that an actual measurement result on the primary cell is denoted by x, an actual measurement result on the secondary cell is denoted by y, and a pre-defined value is denoted by z. When measurement reporting is triggered, if the secondary cell is deactivated, the UE reports x and z to the BS as a measurement result. The BS receives the measurement result, and may determine that the secondary cell is deactivated.

The present invention proposes to use a pre-defined value when performing measurement reporting on the deactivated serving cell. The measurement reporting includes power headroom reporting, CQI reporting, and RRM reporting.

The activation/deactivation status of serving cells can be prevented from being determined differently between the UE and the BS. Further, the UE can be prevented from transmitting incorrect measurement reporting on the deactivated serving cell to the BS.

Figure 9:
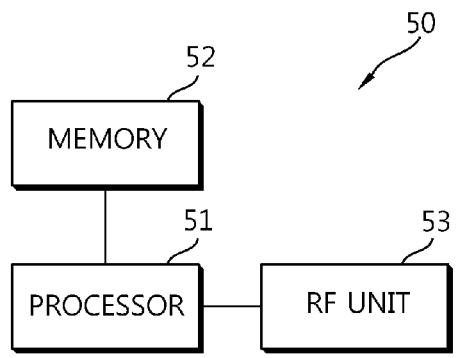
FIG. 9 is a block diagram showing an apparatus for implementing an embodiment of the present invention.

FIG. 9 is a block diagram showing an apparatus for implementing an embodiment of the present invention. The apparatus may be a part of a UE.

An apparatus 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes and/or methods. The processor 51 may perform operations of UE according to the embodiment of FIG. 8.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of reporting a measurement result in a wireless communication system, the method comprising:
    receiving, by a user equipment, a measurement configuration for a primary cell and a secondary cell,
    wherein the primary cell is always activated;
    performing, by the user equipment, a measurement in accordance with the measurement configuration to acquire actual measurement results for the primary cell and the secondary cell;
    determining, by the user equipment, whether the secondary cell is activated or deactivated;
    transmitting, by the user equipment to a base station, an actual measurement result for the primary cell and a pre-defined value for the secondary cell if the secondary cell is determined by the user equipment to be deactivated,
    wherein the pre-defined value is used by the base station to determine that the secondary cell is deactivated, and
    wherein the pre-defined value is defined irrespective of an actual measurement result as a headroom for the deactivated secondary cell; and
    transmitting, by the user equipment, actual measurement results for the primary cell and the secondary cell if the secondary cell is determined by the user equipment to be activated.

2. The method of claim 1, wherein the actual measurement result is a channel quality indicator.

3. The method of claim 1, wherein the actual measurement result is a power headroom of the user equipment.

4. The method of claim 1, wherein the primary cell and the secondary cell are serving cells.

5. The method of claim 1, wherein the secondary cell is activated or deactivated by receiving an activation command from a base station.

6. The method of claim 1, wherein the secondary cell is deactivated when a deactivation timer is expired, wherein the deactivation timer is started when the secondary cell is activated.

7. The method of claim 1, wherein the pre-defined value is "000000".

8. The method of claim 1, wherein the pre-defined value is "111111".

9. A user equipment, comprising:
    a radio frequency unit for transmitting and receiving radio signals; and
    a processor operatively coupled with the radio frequency unit and configured to:
        receive a measurement configuration for a primary cell and a secondary cell,
        wherein the primary cell is always activated;
        perform a measurement in accordance with the measurement configuration to acquire actual measurement results for the primary cell and the secondary cell;
        determine whether the secondary cell is activated or deactivated;
        transmit to a base station an actual measurement result for the primary cell and a pre-defined value for the secondary cell if the secondary cell is determined by the processor to be deactivated,
        wherein the pre-defined value is used by the base station to determine that the secondary cell is deactivated, and
        wherein the pre-defined value is defined irrespective of an actual measurement result as a headroom for the deactivated secondary cell; and
        transmit actual measurement results for the primary cell and the secondary cell if the secondary cell is determined by the processor to be activated.

10. The user equipment of claim 9, wherein the actual measurement result is a channel quality indicator.

11. The user equipment of claim 9, wherein the actual measurement result is a power headroom of the user equipment.

12. The user equipment of claim 9, wherein the primary cell and the secondary cell are serving cells.

13. The user equipment of claim 9, wherein the secondary cell is activated or deactivated by receiving an activation command from a base station.

14. The user equipment of claim 9, wherein the secondary cell is deactivated when a deactivation timer is expired, wherein the deactivation timer is started when the secondary cell is activated.

15. The user equipment of claim 9, wherein the pre-defined value is "000000".

16. The user equipment of claim 9, wherein the pre-defined value is "111111".

* * * * *